No. 661,073. Patented Nov. 6, 1900.
W. PAULITSCHKE & F. BARILITSCH.
SAUSAGE STUFFING AND LINKING MACHINE.
(Application filed Apr. 20, 1899.)

(No Model.) 3 Sheets—Sheet 1.

Witnesses

Inventors
Wilhelm Paulitschke
Franz Barilitsch
By Wm. E. Boulter
their Attorney

No. 661,073. Patented Nov. 6, 1900.
W. PAULITSCHKE & F. BARILITSCH.
SAUSAGE STUFFING AND LINKING MACHINE.
(Application filed Apr. 20, 1899.)
(No Model.) 3 Sheets—Sheet 2.
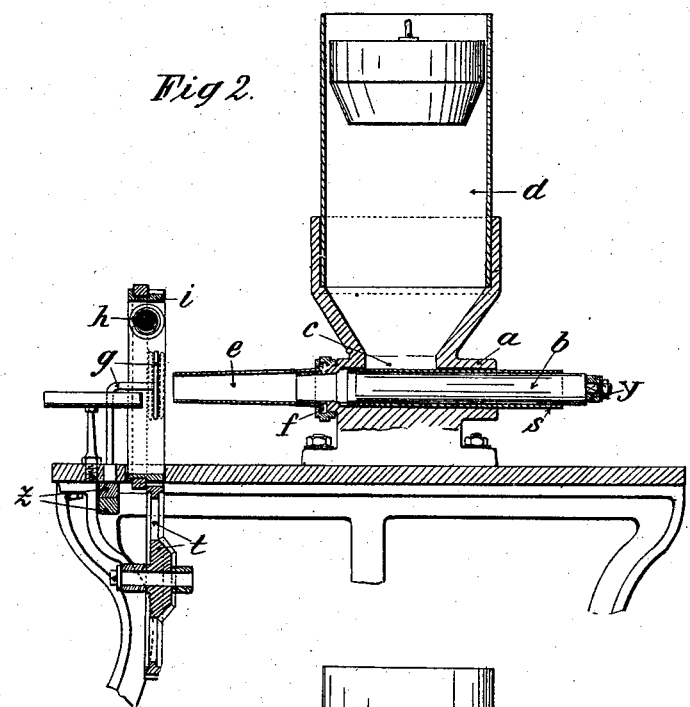
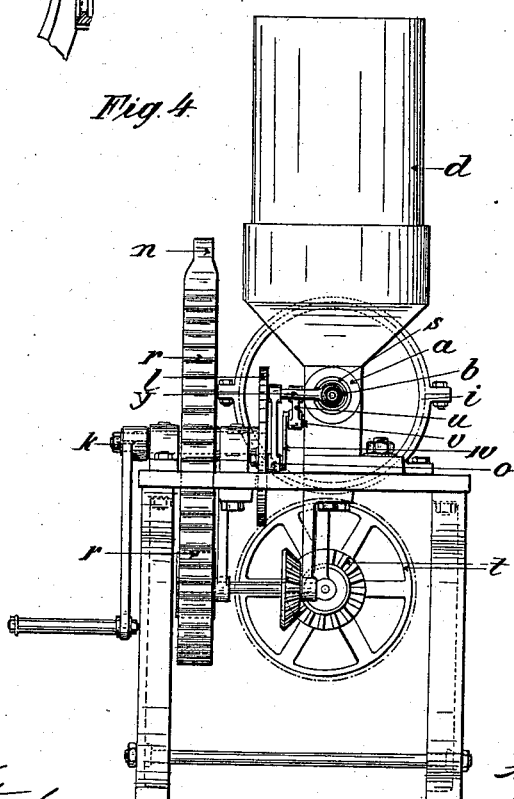
Witnesses: Inventors
Wilhelm Paulitschke
Franz Barilitsch
By W. E. Boulter,
their Attorney No. 661,073. Patented Nov. 6, 1900.
W. PAULITSCHKE & F. BARILITSCH.
SAUSAGE STUFFING AND LINKING MACHINE.
(Application filed Apr. 20, 1899.)
(No Model.) 3 Sheets—Sheet 3.
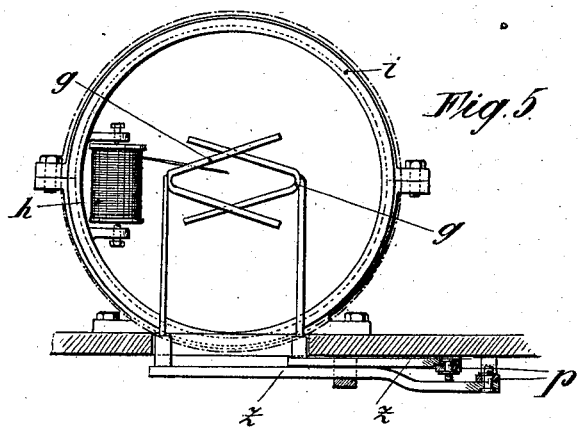
Fig. 5.
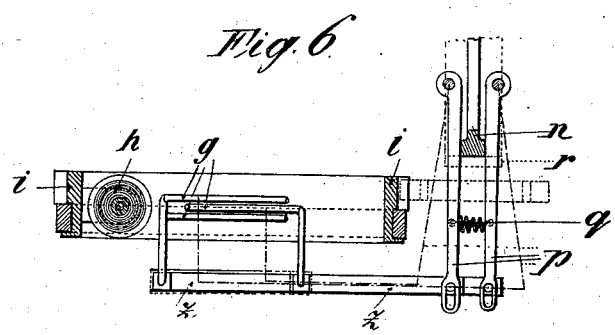
Fig. 6.
Fig. 7.
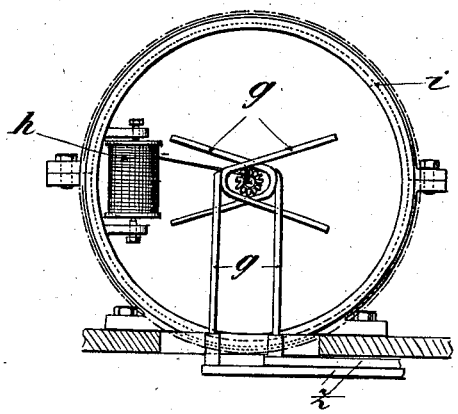
Witnesses: Inventors:
Wilhelm Paulitschke
Franz Barilitsch
Their Attorney.

UNITED STATES PATENT OFFICE.

WILHELM PAULITSCHKE AND FRANZ BARILITSCH, OF MÖDLING, AUSTRIA-HUNGARY.

SAUSAGE STUFFING AND LINKING MACHINE.

SPECIFICATION forming part of Letters Patent No. 661,073, dated November 6, 1900.

Application filed April 20, 1899. Serial No. 713,751. (No model.)

*To all whom it may concern:*

Be it known that we, WILHELM PAULITSCHKE, railway official, and FRANZ BARILITSCH, manufacturer, citizens of the Empire of Austria-Hungary, residing at Mödling, near Vienna, Lower Austria, Austria-Hungary, have invented certain new and useful Improvements in Machines for Stuffing, Dividing, and Tying Sausages; and we do declare the following to be a full, clear, and exact description of the invention, such as will enable others skilled in the art to which it appertains to make and use the same.

This invention relates to a new or improved machine, the object of which is to effect mechanically all the manipulations required in the manufacture of all kinds of sausages in order to save time and expense in the form of wages, &c.; and, furthermore, to produce sausages of exactly uniform predetermined weight—an aim which, with manual labor, could hitherto, but inadequately, be attained, because with handwork only the judgment of the eye could be relied upon, so that mistakes as to length and weight of the separate sausages were unavoidable. The new or improved machine automatically effects the stuffing of the material into the skin or gut, the dividing of the stuffed skin into equal lengths of uniform weight, and finally the throttling and tying of the stuffed skins at the points of division. The twine or other material used for tying is continued from one point of division to the next following without being cut, so that all the separate lengths of sausage remain connected with each other and undoing of the ties and tearing of the string of sausages during boiling or smoking is obviated as far as possible if ordinary care is used in their manipulation.

The drawings hereto attached illustrate one form of construction of a machine for manufacturing sausages designed in accordance with the present invention.

Figure 1:
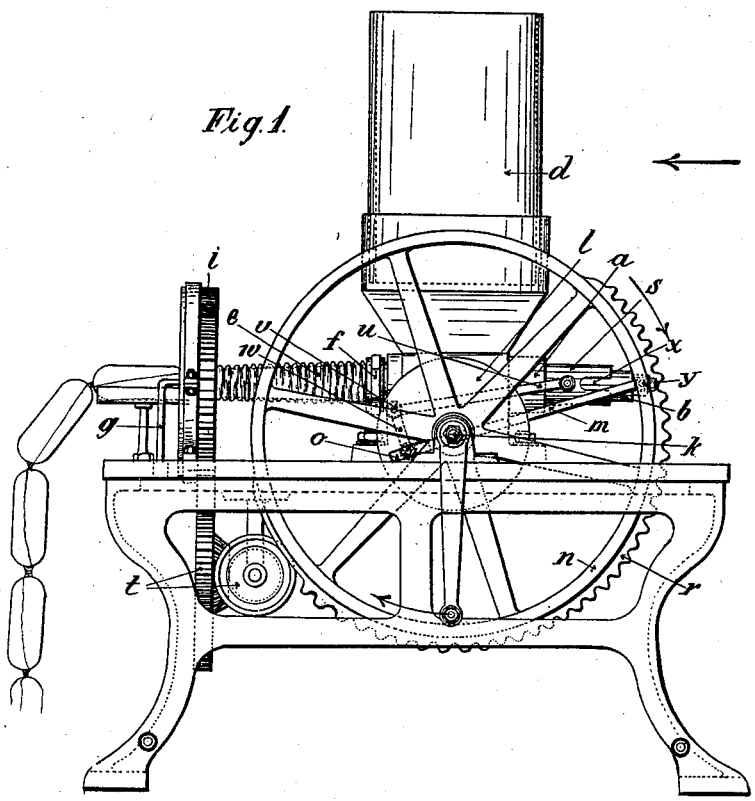
Figure 3:
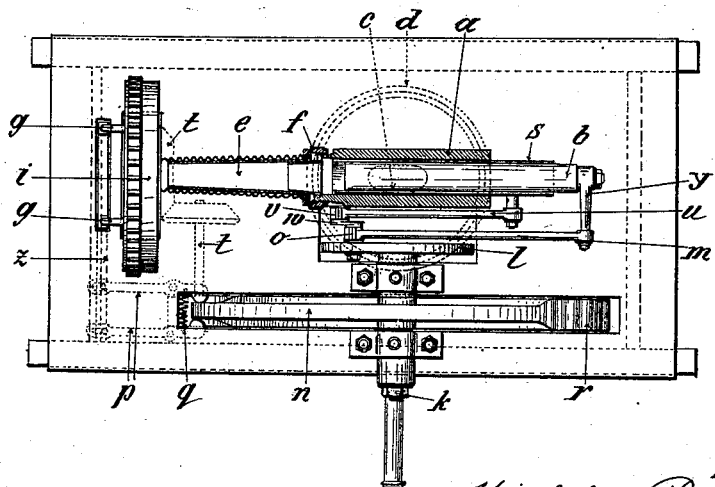

Figure 1 is a side elevation of the machine; Fig. 2, a vertical section; Fig. 3, a top view with partial horizontal section, and Fig. 4 a rear view seen in the direction of the arrow shown to the right of Fig. 1. Figs. 5, 6, and 7 illustrate the mechanism for dividing the stuffed skin into lengths and tying the same.

The machine, as illustrated, has a preferably horizontally disposed tube or cylinder $a$, which communicates with the feed-hopper $d$, intended to receive and supply the sausage material through aperture $c$, the material passing continually under the pressure of a suitably-arranged weight through the said aperture $c$ into tube $a$. A piston $b$, displaceable in tube $a$, the stroke of which can be regulated in order to determine the length of the separate sausages, is provided for the purpose of moving forward at each stroke the material contained in tube $a$ toward the other end of said tube and into a skin or gut which is preferably pushed over a slightly-conical tube $e$, attached at $f$ to the extremity of tube $a$ by means of a screw-joint or in other convenient manner. In front of the mouth or nozzle of the conical tube $e$ there are placed two forks or clamps $g$ $g$, movable toward and from each other, which as soon as the stuffed skin has been pushed forward a given distance are automatically approached to each other, so as to throttle the stuffed skin, dividing it into given lengths and firmly holding it while the tying process is being carried out.

The tying of each separate length of sausage is effected by means of suitable material—such as twine, thread, or wire—said material being wound around the throttled part of the stuffed skin. For this purpose the tying material is preferably wound on bobbins or reels $h$, which are suitably secured to an intermittently-revoluble ring $i$. The said ring $i$ is made to concentrically surround the stuffed skin. The twine or other tying material is not cut after the tie has been made, but is led over the separate sausages from one tie to the next following, so that undoing of the ties and tearing of the string of sausages cannot easily occur.

The operation of the stuffing-piston $b$ of forks $g$ $g$ and of tying device $h$ $i$ can be effected in various manners. In the construction illustrated in the accompanying drawings, which we consider the simplest and most effective, the motive power proceeds from a common fly-wheel shaft $k$, which transmits its motion to piston $b$ by means of crank disk or arm $l$ and connecting-rod $m$, while the fly-wheel $n$ directly effects the working of forks *g g* and of bobbin-holding ring *i*. For the purpose of admitting of changing the length of stroke of piston *b*, according to the size and weight of the sausages to be produced, the connecting-rod *m* is secured to the crank disk or arm *l* by means of an adjustable pivot-pin *o*, while the other extremity of said connecting-rod is clamped to a stud provided at the side of the stuffing-piston *b*.

The mechanism for operating the throttling-forks *g g* is most efficaciously constructed in the manner illustrated in Figs. 5, 6, and 7. Bars or rods *p p*, carrying the said throttling-forks *g g*—i. e., the levers *z z*, supporting the latter—are placed at both sides of the felly or rim of fly-wheel *n* and are continuously held pressed against said sides by the action of spring *q*, Figs. 3 and 6. One half of the periphery *r* of the rim of wheel *n* is made wider than the other half, the transitions from wide to narrow being made wedge-shaped, as shown in Figs. 3 and 4, so that upon the wider portion of the wheel-rim entering between bars *p p* the latter are pushed farther apart. The throttling-forks *g g* are thereby approached to each other, and the stuffed skin, changing from the position shown in Fig. 5 to that illustrated in Fig. 7, thus gripping and compressing the stuffed skin and dividing it into equal lengths, Fig. 7. This operation takes place simultaneously with that half of a revolution of the fly-wheel *n* during which the piston *b* makes its return stroke—i. e., resumes its rearmost position previous to the next forward stroke. At the same time the tying device *h i* is put into operation. For this purpose the circumference of ring *i* is provided with cogs or teeth or with a suitable friction-surface, into or with which engages a transmission-gearing *t*, rotated by fly-wheel *n*. The wider portion of the circumference of the latter, which also actuates forks *g g* in the manner described, is furnished on its outward surface with cogs or a suitable friction-surface, into or with which the said transmission-gearing *t* engages during the respective half of a revolution of wheel *n*, while piston *b* is making its return stroke. The bobbin-holding ring *i* is therefore rotated by gearing *t*, whereby the twine or other tying material is wound off bobbin *h* and around the throttled or compressed part of the stuffed skin, the requisite predetermined length of sausage being thereby divided from the remainder.

In order to efficiently prevent the sausage-stuffing material from being pushed back into hopper *d* by the forward stroke of piston *b*, (an occurrence which may partially be obviated by placing a suitable weight upon the material in hopper *d*,) a contrivance has been devised for closing the communicating aperture *c* between tube *a* and hopper *d* during the forward stroke of stuffing-piston *b*, by which the possibility of the stuffing material returning into hopper *d* is entirely obviated. The said contrivance essentially consists of a thin-walled tube or cylinder *s*, suitably inserted between the stuffing-piston *b* and the inner surface of tube *a*. This tube or cylinder *s*, preferably sharpened at its forward extremity, is movably connected with crank disk or arm *l* by rod *u*. It may, if required, be replaced by a flat or otherwise suitably-shaped slide-plate. The crank-pin *v* is connected by arm *w* with pin *o* of piston-pushing rod *m* in such manner that cylinder *s* is caused to precede piston *b*, and that upon adjustment of pivot-pin *o* for the purpose of changing the length of the stroke of the piston the other pin *v* is displaced simultaneously, so that the preceding of cylinder *s* relative to piston *b* is assured in all cases. The cylinder *s* is provided with a longitudinal slot *x*, Fig. 3, adapted to receive arm *y* of piston *b*, the movement of piston *b* being thereby rendered independent of that of cylinder *s*. It may appear advisable to arrange crank-pin *v* for holding connecting-rod *u* of cylinder *s* at greater distance from the center of shaft *k* than pivot-pin *o* of connecting-rod *m* of stuffing-piston *b* in order to admit of giving a longer stroke to cylinder *s* independent of its normal preceding the movement of piston *b*.

Having now particularly described and ascertained the nature of our said invention and in what manner the same is to be performed, we declare that what we claim is—

1. In a machine of the character described, the combination with a hopper, of a cylinder arranged beneath the discharge-opening of the hopper, a piston arranged and adapted to be reciprocated in the cylinder, a thin tube arranged intermediate the piston and cylinder and adapted to be reciprocated independently of the piston in the manner described, and means for reciprocating the tube and piston.

2. In a machine of the character described, the combination with a hopper, of a cylinder arranged beneath the discharge-opening of the hopper, a piston arranged and adapted to be reciprocated in the cylinder, a thin tube arranged intermediate the piston and cylinder and adapted to be reciprocated independently of the piston in the manner described, means for reciprocating the tube and piston and means for varying the stroke of the tube and piston.

3. In a machine of the character described, the combination with a stuffing mechanism, of forks *g g* arranged to engage and throttle the stuffed skin at predetermined points means for reciprocating the forks from opposite directions, and means for winding twine around the stuffed skin at the points where the same is throttled by the forks and while held by the latter.

4. In a machine of the character described, the combination with a hopper, of a cylinder arranged beneath the discharge-opening of the hopper, a piston arranged and adapted to be reciprocated in the cylinder, a tube *s* arranged to slide between the piston and the cylinder, a driving-shaft, a crank-disk, an arm $w$ having a pivotal connection with the disk, rod $u$ pivotally connected with the arm $w$ and with the tube, and a rod $m$ pivotally connected with the arm $w$ and the piston, the pivotal point of arm $w$, with rod $u$ being at a greater distance from the center of the driving-shaft than the pivotal point of rod $m$ with the arm $w$ for the purpose specified.

5. In a machine of the character described, the combination with a stuffing mechanism, of forks $g, g$, arranged to engage and throttle the stuffed skin at predetermined points, levers $z, z$, carrying the forks, pivoted rods $p, p$, having a connection at one end with the levers, a rotatable wheel $n$ upon opposite sides of the rim of which the other end of the rods are arranged and adapted to bear, the said rim for a portion of its length being widened, means for rotating the wheel, and means for winding twine around the stuffed skin at the points where the same is throttled by the forks.

In testimony whereof we affix our signatures in presence of two witnesses.

WILHELM PAULITSCHKE.
FRANZ BARILITSCH.

Witnesses:
WILHELM BERGER,
ALVESTO S. HOGUE.